United States Patent
Ramasubramaniam et al.

(10) Patent No.: US 9,811,428 B2
(45) Date of Patent: Nov. 7, 2017

(54) SYSTEM AND METHOD FOR HANDLING MULTI-NODE FAILURES IN A DISASTER RECOVERY CLUSTER

(71) Applicant: NetApp, Inc., Sunnyvale, CA (US)

(72) Inventors: Vaiapuri Ramasubramaniam, Bangalore (IN); Harihara Kadayam, Freemont, CA (US); Parag Sarfare, Santa Clara, CA (US); Yong Eun Cho, Saratoga, CA (US); Chaitanya Patel, Morrisville, NC (US); Hrishikesh Keremane, Bangalore (IN); Prachi Deshmukh, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 211 days.

(21) Appl. No.: 14/559,343

(22) Filed: Dec. 3, 2014

(65) Prior Publication Data

US 2016/0085647 A1  Mar. 24, 2016

(30) Foreign Application Priority Data

Sep. 22, 2014  (IN) .......................... 2709/DEL/2014

(51) Int. Cl.
*G06F 11/00* (2006.01)
*G06F 11/20* (2006.01)

(52) U.S. Cl.
CPC ...... *G06F 11/2033* (2013.01); *G06F 11/2028* (2013.01); *G06F 11/2041* (2013.01); *G06F 11/2046* (2013.01); *G06F 2201/805* (2013.01)

(58) Field of Classification Search
CPC .............. G06F 11/2028; G06F 11/203; G06F 11/2033; G06F 11/2041; G06F 11/2046
See application file for complete search history.

(56) References Cited

U.S. PATENT DOCUMENTS

| | | | |
|---|---|---|---|
| 5,796,934 A * | 8/1998 | Bhanot ............... | G06F 11/1474 714/15 |
| 6,715,100 B1 | 3/2004 | Hwang | |
| 7,925,917 B1 | 4/2011 | Roy | |
| 8,751,533 B1 * | 6/2014 | Dhavale ............... | G06F 3/0647 707/782 |
| 2002/0073354 A1 | 6/2002 | Schroiff et al. | |
| 2011/0225095 A1 * | 9/2011 | Gawali ............... | G06F 11/2023 705/300 |
| 2014/0173336 A1 * | 6/2014 | Bennah ............... | G06F 11/2028 714/4.12 |
| 2015/0006951 A1 * | 1/2015 | Gurram ............... | G06F 11/2028 714/4.12 |
| 2015/0317226 A1 * | 11/2015 | Sarfare ................ | G06F 11/203 714/4.11 |

FOREIGN PATENT DOCUMENTS

WO   03/102772 A2   12/2003

OTHER PUBLICATIONS

Int. Search Report/Written Opinion cited in PCT Application No. PCT/US2015/051179 dated Apr. 26, 2016, 16 pgs.

* cited by examiner

*Primary Examiner* — Michael Maskulinski
(74) *Attorney, Agent, or Firm* — Cooper Legal Group, LLC

(57) ABSTRACT

A system and method for handling multi-node failures in a disaster recovery cluster is provided. In the event of an error condition, a switchover operation occurs from the failed nodes to one or more surviving nodes. Data stored in non-volatile random access memory is recovered by the surviving nodes to bring storage objects, e.g., disks, aggregates and/or volumes into a consistent state.

20 Claims, 9 Drawing Sheets

SYSTEM AND METHOD FOR HANDLING MULTI-NODE FAILURES IN A DISASTER RECOVERY CLUSTER

RELATED APPLICATION

The present application claims priority to Indian patent application entitled SYSTEM AND METHOD FOR HANDLING MULTI-NODE FAILURES IN A DISASTER RECOVERY CLUSTER the application of which was filed by Ramasubramaniam et al. on Sep. 22, 2014 and accorded Indian Application No. 2709/DEL/2014.

BACKGROUND INFORMATION

1. Technical Field

The present disclosure relates to clustered storage systems and, more specifically, to managing multiple failures in a clustered storage system 2. Background Information A storage system typically includes one or more storage devices, such as disks, into which information (i.e. data) may be entered, and from which data may be obtained, as desired. The storage system (i.e., node) may logically organize the data stored on the devices as storage containers, such as files, logical units (luns), and/or aggregates having one or more volumes that hold files and/or luns. To improve the performance and availability of the data contained in the storage containers, a plurality of nodes may be interconnected as a cluster configured to provide storage service relating to the organization of the storage containers and with the property that when one node fails another node may service data access requests, i.e., operations, directed to the failed node's storage containers.

Nodes may be arranged in a high availability (HA) pair to enable takeover operations in the event of a failure of one of the nodes. HA pairs at differing sites may be further configured into a disaster recovery (DR) group to provide switchover operations in the event of a failure at a particular site. Conventional clustering systems may be arranged for a single failover; however, in the event of multiple nodes failing, conventional failover systems may not support continued operations without loss of data.

BRIEF DESCRIPTION OF THE DRAWINGS

The above and further advantages described herein may be better understood by referring to the following description in conjunction with the accompanying drawings in which like reference numerals indicate identically or functionally similar elements, of which.

DESCRIPTION

The aspects described herein provide a system and method for handling multi-node failures in a disaster recovery cluster. In an aspect a system is described for handling asymmetric configurations where a surviving site has fewer nodes than the failed site. In such an aspect, a single node may need to handle multiple disaster recovery partners. To ensure the capability of a node to handle multiple disaster recovery partners, a user configurable object limit option may be set within a management host associated with the node. If the object limit option is set, then the number of objects, such as volumes, that a particular node may host is reduced; however, the node may handle a plurality of other failed nodes' workload in the event of an error condition. Should the object limit option not be set, then the number of objects, e.g., volumes, is increased, but it is possible in the event of multiple failures that data may be inaccessible until returned to service.

Disaster Recovery Group

Figure 1:
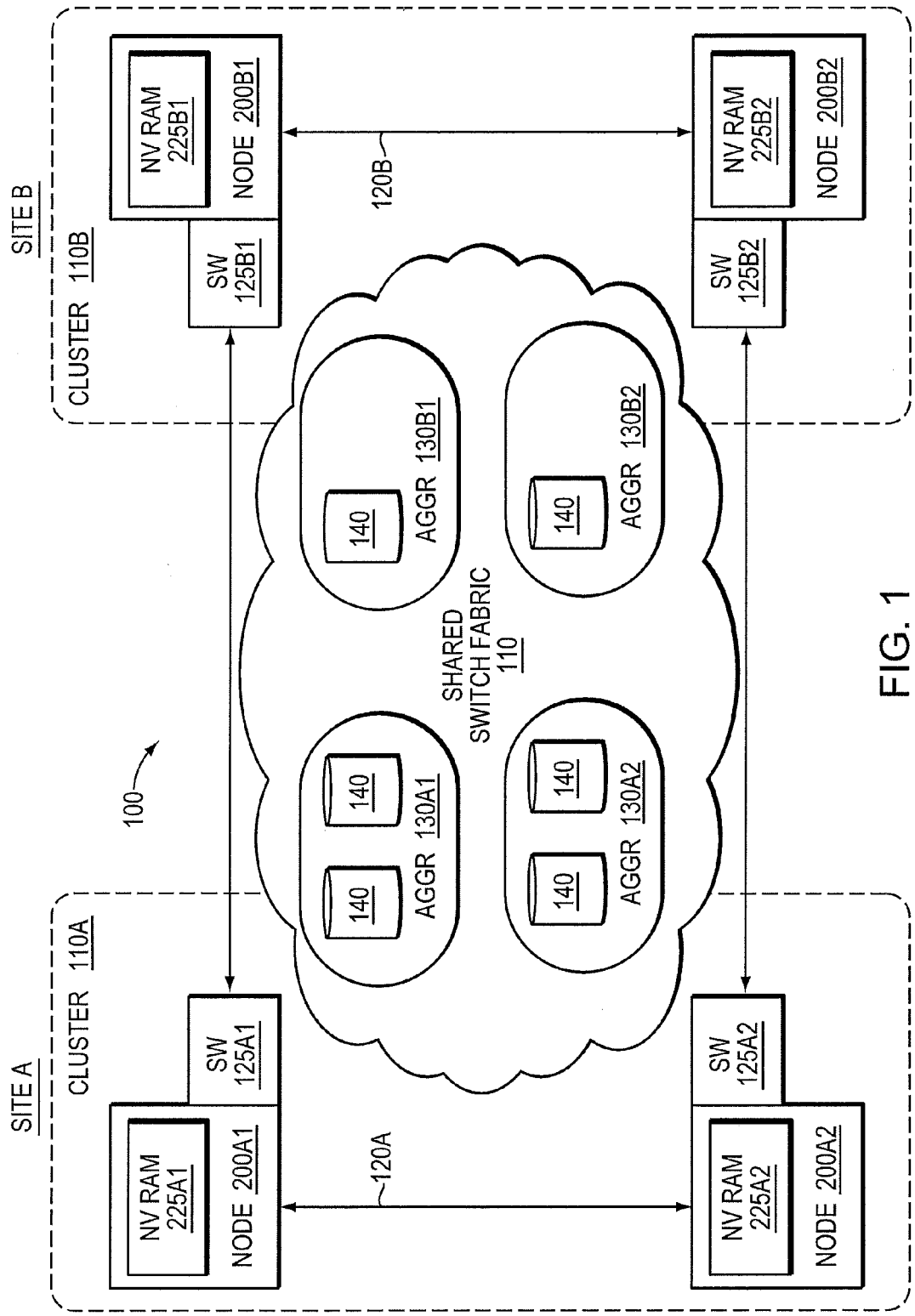
FIG. 1 is a block diagram of a high availability cluster arrangement.

FIG. 1 is a block diagram of a disaster recover (DR) group 100 comprising of nodes 200 disposed at multiple sites, e.g., site A and site B. The sites may be physically remote from one another. The nodes 200 at each site (e.g., Site A, Site B) may arranged as a cluster 110 composed of a high availability (HA) pair (e.g., a local node and HA partner node) interconnected by an HA interconnect 120. Such HA partner arrangement may provide redundancy within the site that if one node should fail, the other node may assume its role by performing a takeover (TO) operation. Similarly, nodes within a site may be paired with nodes of another site to create (DR) pairs (e.g., a local node and DR partner node interconnected via switches 125 (e.g., Fibre Channel (FC) switches). Such DR partner arrangement may provide redundancy across sites, such that if the site within which a node resides should fail, a node at the other may assume its role by performing a switchover (SO) sequence (i.e., a cross-cluster takeover)

Whether a node is a local node, a HA partner node, a DR partner node, or an DR auxiliary Node (i.e., the HA partner node of a DR partner node) depends on the perspective one looks at the system. For example, from the perspective of node 200A1, node 201A1 is the local node, node 200A2 is the HA partner node, node 200B1 is the DR partner node, and node 200B2 is the DR auxiliary node. Likewise, from the perspective of node 200B1, node 200B1 is the local node, node 200B2 is the HA partner node, node 200A1 is the DR partner node, and node 200A2 is the DR auxiliary node. While much of the description below, is from the perspective of node 200A1 (such that node 200A1 is the local node), in some cases perspectives from other nodes, such as node 200B1, are utilized for illustrative purposes. It should be understood that the choice of perspective, and thus the roles of certain nodes, is simply clarity of illustration, and that specific nodes are not limited to specific roles, but instead may simultaneous fulfill multiple roles.

Each node 200 is coupled to a shared storage fabric 110 via a switch 125, e.g. via the node's related switch 125, including a plurality of storage devices (e.g., disks) upon which data may be stored. Clients (not shown) may access data stored in the shared storage fabric 110 by interacting with the nodes 200 in accordance with a client/server model of information delivery. In response to requests (e.g., data access requests) from the clients the nodes 200 may perform operations (e.g., service data access requests directed to storage devices of the shared storage fabric, and logical storage containers organized thereon In a given pool, disks may be organized as Redundant Array of Independent (or Inexpensive) Disks (RAID) groups. The RAID groups may be implemented at a raid level, such as RAID-4 where reliability/integrity of stat storage is increased by redundant writing of data "stripes" across a given number of storage devices in the RAID group, and parity information with respect to the striped data being stored on dedicated storage device. Likewise, a RAID groups may be implemented using another type of RAID implementation, such as RAID double-parity (RAID-DP) which implements double parity stripes within a RAID-6 type layout. In alternative aspects, storage devices may be organized in a synchronized RAID mirror that mirrors aggregates. Such a synchronized RAID mirroring arrangement provides a mirrored copy of the data to the DR partner. It should be understood that a wide variety of other levels and types of RAID may alternatively be utilized.

One or more RAID groups may be organized into aggregates (AGGRs) that represent a collection of storage. The aggregates may include a root aggregate that contains a root volume storing special directories and configuration files, as well as data aggregates which store user data. While each aggregate may be physically accessible to multiple nodes 200, each aggregate is generally "owned" by a single node which is arranged to perform operations (e.g., service data access requests) directed to that aggregate. Illustratively, individual aggregates may be owned by particular node. Thus, for example aggregate 130A1 one may be owned by node 2001A1, etc. It should be noted that while a single aggregate is shown for each node, in alternative aspects of the present invention varying numbers of aggregates may be associated with a single node. During take over operations, a failed nodes' aggregates, volumes and/or disks may be serviced by a surviving node. Thus, for example should node 200A1 fail, the aggregate 130A1 may be serviced by surviving node 200A2. Further, in the event of a larger error condition affecting an entire site, aggregates may be switched over to the alternative site. Various examples described below are directed towards handling situations where multiple nodes have failed in a cluster environment.

To facilitate access to data stored in the shared storage fabric 110, the nodes 200 may further "virtualize" the storage space. For example, a file system, e.g. a Write Anywhere File Layout (WAFL®) file system, may logically organize the data stored on into a hierarchical structure of named storage containers, such as directories and files. Each file may be implemented as set of disk blocks configured to store data, whereas the directory may be implemented as a specially formatted file in which names and links to other files and directories are stored. Further, information may organized into a hierarchical structure of storage containers, such as blocks, that are exported as named logical unit numbers (luns). The nodes 200 may service requests based on file-based access protocols, such as the Common Internet File System (CIFS) protocol or Network File System (NFS) protocol, to permit access to certain storage containers, such as files and directories. Likewise, the nodes 200 may service requests based on block-based access protocols, such as the Small Computer Systems Interface (SCSI) protocol encapsulated over TCP (iSCSI) and SCSI encapsulated over Fibre Channel (FCP), to permit access to form of other types storage containers, such as blocks or luns.

Each node 200 may log ongoing operation (e.g. data access requests) directed to the storage devices of the aggregates 130 owned by the node. Illustratively, such logged operations may include operations have been received and acted upon (processed) not yet been committed (i.e., persistently stored) to the storage devices. This information is illustratively maintained in a non-volatile random access memory (NVRAM) 225 of the node 200, or more specifically a local portion of the NVRAM 225 of the node 200. During normal operation data in the NVRAM (e.g., 225A1) of a local node (e.g., node 200A1) is mirrored to the NVRAM (e.g., 225A2) of the HA partner node (e.g., node 200A2) and maintained in the NVRAM of the HA partner node. As part of a takeover sequence performed by the HA partner node (e.g., 200A2) in response to a failure of the local node (e.g., node 200A1), the HA partner node may assumes the identity of the failed node, accesses the storage devices utilized by the failed node, reply the mirrored operations maintained in its NVRAM (e.g., 225A2).

Similarly, during normal operation data in the NVRAM (e.g., 225A1) of a local node (e.g., node 200A1) is mirrored to the NVRAM (e.g., 225B1) of the DR partner node (e.g., node 200B1) and maintained in the NVRAM of the DR partner node. As part of a switchover sequence performed by the DR partner node (e.g., 200B1) in response to a failure of the site (e.g., Site A) of the local node (e.g., node 200A1), the DR partner node may assumes the identity of the failed node and reply the mirrored operations maintained in its NVRAM (e.g., 225B1). Since the DR partner node (e.g., 200B1) itself has an HA partner node (e.g., auxiliary node 200B2), it should be understood that data in the NVRAM (e.g., 225A1) of a local node (e.g., node 200A1) mirrored to the DR partner node (e.g., 200B1) may further be mirrored to the auxiliary node (e.g., node 200B2), thereby allowing that node to also be able to take over for the node, in case of multiple failures.

Node

Figure 2:
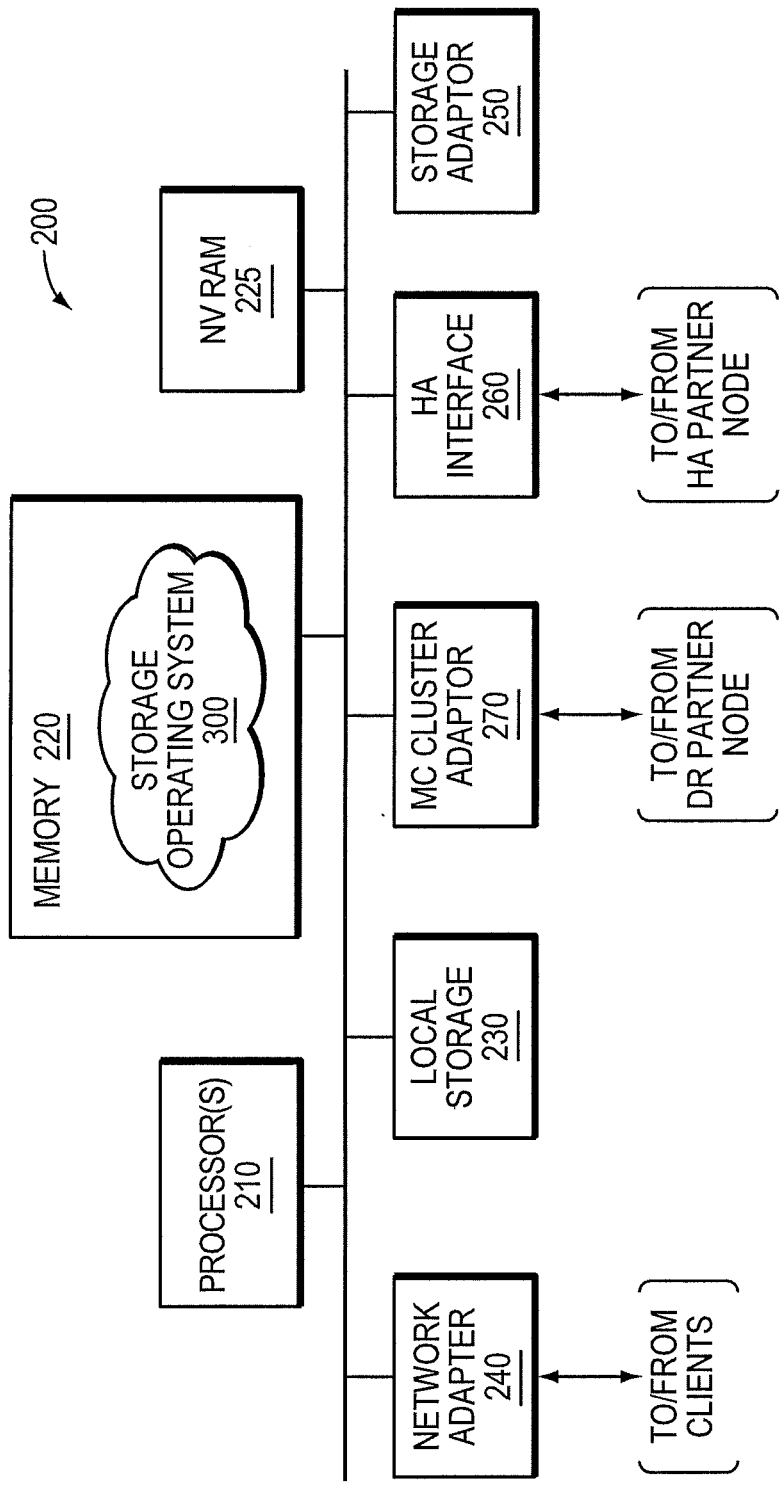
FIG. 2 is a block diagram of a node.

FIG. 2 is a block diagram of a node 200 that may be utilized in the disaster DR group 100 of FIG. 1 (e.g., as node 200A1, 200A2, 200B1 or 200B2). The node 200 includes one or more processors 210, a memory 220, local storage 230, a network adapter 270, a virtual interface (VI) adaptor 240, an HA interface 250, a storage adapter 260, and a NVRAM 225 interconnected by a system interconnect, such as bus.

The processor(s) 210 and in some implementations, the adapters/interfaces 240-270 may include processing elements and/or logic circuitry configured to execute software programs and manipulate the data structures. In some cases, the processing elements of the adapters/interfaces 240-270 may be configured to offload some or all of the packet processing and storage access operations, respectively, from the processor(s) 210 to thereby increase the performance of the storage service provided by the node 200.

The memory 220 may include memory locations for storing at least some of the software programs and manipulate the data structures. Among these programs may be a storage operating system 225 that functionally organizes the node 200 by, among other things invoking operations in support of the storage service implemented by the node. In an aspect, the storage operating system is the NetApp® Data ONTAP™ operating system available from NetApp Inc., Sunnyvale, Calif. that implements the WAFL® file system. However, a variety of other types of storage operating systems that implement other types of file systems may alternatively be utilized.

The local storage 230 may include one or more local storage devices, such as solid state drives illustratively embodied as flash storage devices, utilized by the node to persistently store configuration information provided by one or more processes that execute on the node 200. The network adapter 240 may include one or more ports adapted to couple the node 200 to the clients over a network, which may, for example, take the form of an Ethernet network or a FC network. As such, the network adapter 240 may include a network interface controller (NIC) that may include a TCP/IP offload engine (TOE) and/or an iSCSI host bus adapter (HBA). Likewise, the storage adapter 250 may include one or more ports adapted to couple the node 200, via a switch (e.g., FC switch) 125, to storage devices of the shared storage fabric 110, cooperates with the storage operating system 300 executing on the node 200 to service operations (e.g. data access requests) directed to the storage devices of the shared storage fabric 110. In one implementation, the storage adaptor takes the form of a FC host bus adaptor (HBA).

As discussed above, NVRAM 225 may log information such as ongoing operations (e.g. data access requests) serviced by the node 200, including operations have not yet been committed (i.e., persistently stored) to the storage devices. Such information may be maintained in a local portion of the NVRAM 225. Further, to permit TO and SO operations, the NVRAM may also store mirrored copies of information, such as logged operations serviced by the other nodes of the DR group (e.g., the nodes HA partner node, DR partner node, and Auxiliary node). Such information may be maintained in respective other portions of the NVRAM 225. In order to persistently store the logged information, the NVRAM 225 may include a back-up battery or be designed to intrinsically have last-state retention capability (e.g., include non-volatile semiconductor memory such as storage class memory) that allows the NVRAM to maintain information through system restarts, power failures, and the like.

A HA interface 260 may include port circuitry adapted to couple the node 200 to an HA partner node of a cluster via the HA interconnect 120. The HA interface 260 may be utilized to mirror (copy) the information, such as the operations (e.g. data access requests), maintained in the NVRAM of the node 200 to the NVRAM of its HA partner node, for example, utilizing remote direct memory access (RDMA) protocol. The operations may be processed by the file system of the node 200 and logged in the NVRAM 300 on a per-operation (e.g., per request basis).

Further, a metro cluster (MC) virtual interface (VI) adaptor 270 may include port circuitry adapted to couple the node 200 to an a DR partner node, via switches (e.g., FC switches) 120. In one implementation, the MC VI adaptor 270 may be a FC VI adaptor. Similar to the HA interface, the MC VI adaptor may be utilized to mirror (copy) information, such as the operations (e.g. data access requests), maintained in the NVRAM of the node 200 to the NVRAM of its DR partner node. The MC VI adaptor 270 may copy ("mirror") the operations from the NVRAM of the node 200 to an NVRAM the DR partner node on a per-operation (e.g., per request basis).

Storage Operating System

To facilitate access to the disks 140, the storage operating system 300 implements a write-anywhere file system that cooperates with one or more virtualization modules to "virtualize" the storage space provided by disks 140. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns). It is expressly contemplated that any appropriate storage operating system may be enhanced for use in accordance with the inventive principles described herein.

Figure 3:
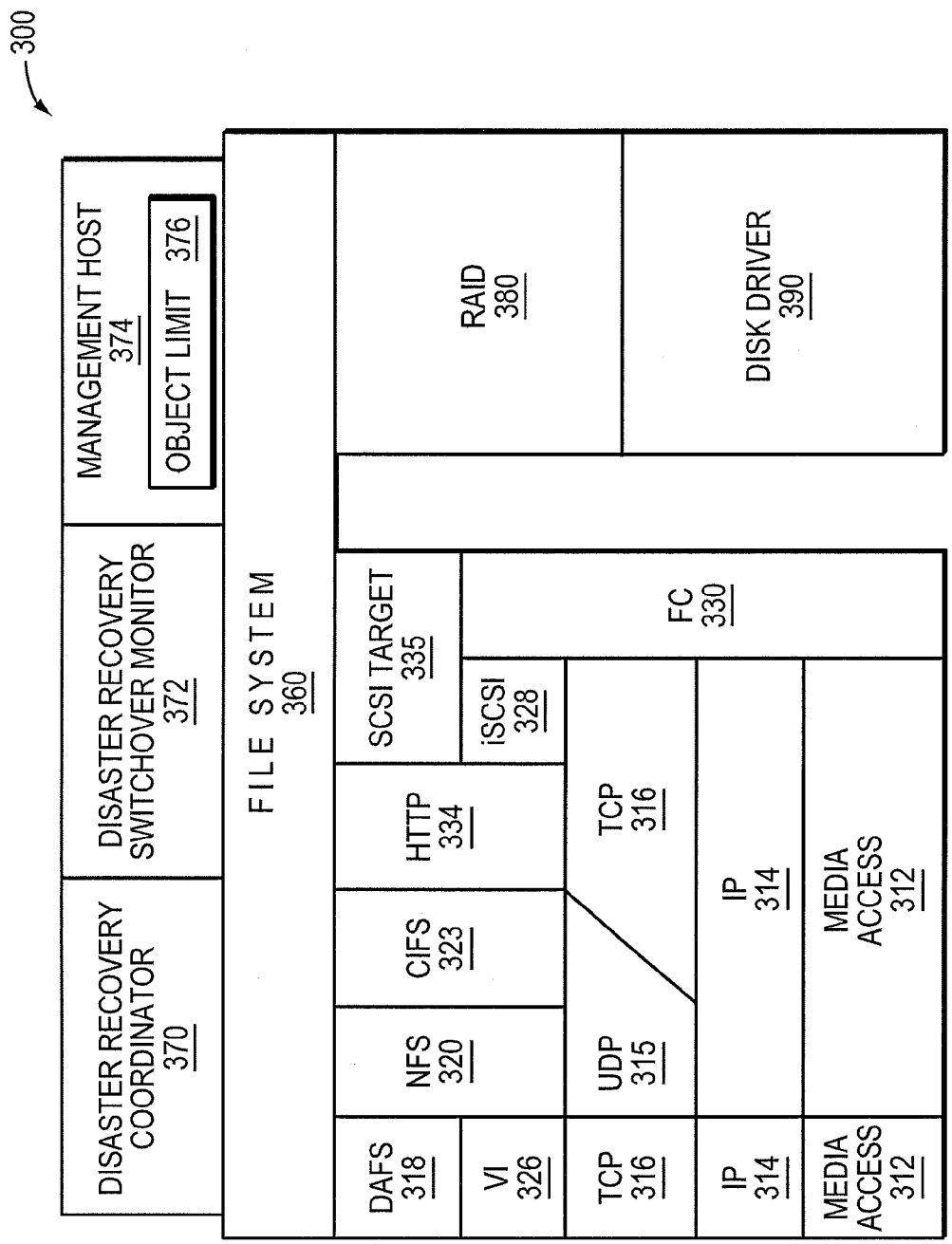
FIG. 3 is a block diagram of a storage operating system.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 323 and the Hypertext Transfer Protocol (HTTP) protocol 334. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server that provides data paths for accessing information stored on the disks 140 of the node 200. To that end, the storage server includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 810 (see FIG. 8), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system 360 uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Further exemplary storage operating system 300 modules include a disaster recovery coordinator (DRC) 370, a disaster recovery switchover monitor (DRSOM) 372 and a management host 374. The DRC 370 implements cluster wide disaster recovery operations. In an example, each node may include DRC module 370; however, only one instantiation of the DRC module 370 is active at any point in time. The DRC module 370 cooperates with DRSOM modules 372 on each of the nodes to implement the various switchover operations described further below. DRSOM module 372 implements node specific switchover operations. That is, the DRC 370 coordinates the operations of the various DRSOMs 372 executing on each of the nodes in the event of a switchover operation. As will be appreciated by those skilled in the art, the functionality of the DRC 370 and DRSOMs 372 are to be taken as exemplary only. In alternative examples, the functionality maybe arranged differently between the two modules and/or the modules may be combined into a single module or have the functionality distributed among a plurality of different modules. As such, the description of a DRC module 370 operating on cluster wide operations, while DRSOM module 372 operates on node level operations should be taken as exemplary only.

The management host 374 implements various management functionalities and stores management information in accordance with an illustrative aspect of the disclosure. Illustratively, the management host 374 stores an object limit option 376. The object limit option 376 is utilized in accordance with aspects of the disclosure to determine a maximum number of objects, such as volumes, that a particular node may service. Illustratively, each particular node may have specific limits for various objects, such as volume discount, aggregates, etc. In a high-availability configuration, a single node may double the number of objects when it takes over its a failed partner node. That is, if N/2 is the per node limit for an object, then in takeover mode, the limit for that object count is N, i.e., N/2 for the local node and N/2 for the partner node. However, in a disaster recovery group such as that described above in relation to FIG. 1, it is possible that three nodes may fail leaving a single surviving node. If each of the nodes was operating using its maximum assigned number of volumes, then the single surviving node could potentially need to service a total of 2N volumes. If the node object limit is not set on a particular node, then it would operate with a limit of N objects in normal operation; however, in the event of the other three nodes failing, the surviving node could not takeover and/or switchover from the failed nodes as it could need to handle up to 4N objects, which exceed the storage operating system's maximum object limitation. In accordance with an aspect of the disclosure, the object limit option 376 enables an administrator to decide between additional disaster recovery capability or ability to service additional volumes (or objects) on a given node.

Should the object limit option be set for a particular node, then a maximum of N/2 number of volumes is supported for that node. That is, setting the object limit option 376 causes the total number of the volumes that may be serviced by a single node to be reduced in half. However, in the event of a failure of the other three nodes within a disaster recovery group, the surviving node would be able to handle up to 2N volumes. As each of the nodes could be serving at most N/2 volumes, the surviving node would be able to process all volumes during the switchover operation. This provides support for a double failure, the failure of a site within a disaster recovery group as well as the failure of a notes high-availability partner.

If the object limit option is not set, then each node may support a maximum number of N volumes. Thus, in the event of a single failure, for example, the failure of a high-availability partner, a node may service up to 2N volumes. However, should the object limit option 376 be disabled, then no double failover operations would be permitted.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

The in-core and on-disk format structures of an exemplary file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
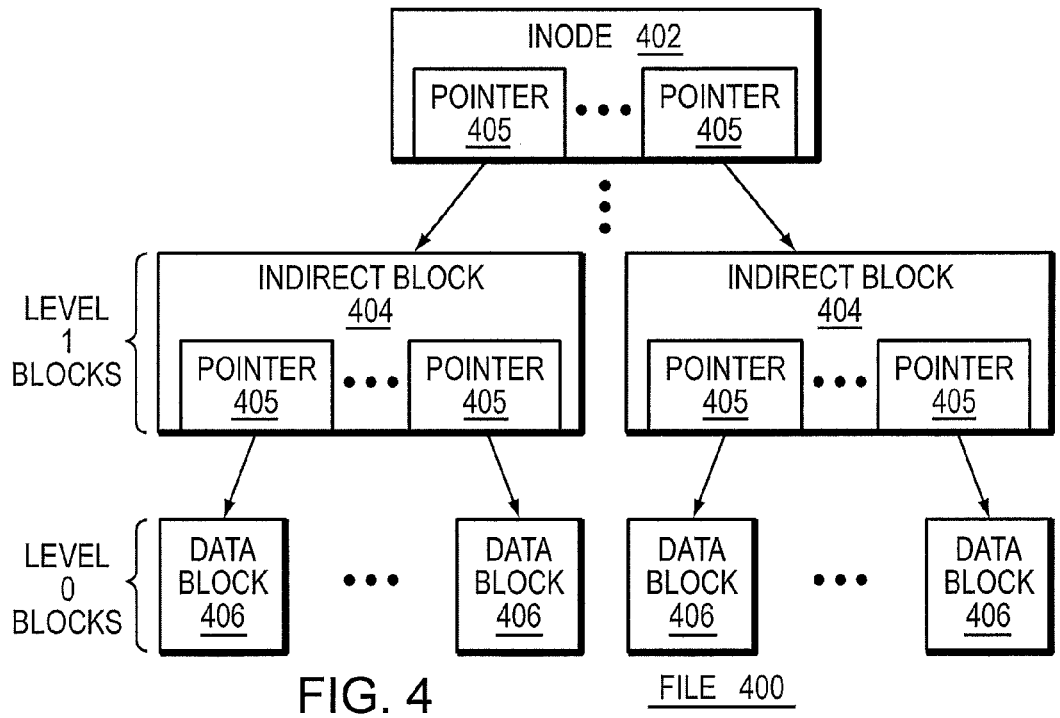
FIG. 4 is a schematic block diagram of an illustrative buffer tree of a file that may be advantageously used with the present invention.

FIG. 4 is a schematic block diagram of an illustrative buffer tree of a file that may be advantageously used with the present invention. The buffer tree is an internal representation of blocks for a file (e.g., file 400) loaded into the memory 224 and maintained by the write-anywhere file system 360. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 140.

A file system layout is provided that apportions an underlying physical volume into one or more virtual volumes (or flexible volume) of a storage system, such as node 200. An example of such a file system layout is described in U.S. patent application Ser. No. 10/836,817 titled Extension of Write Anywhere File System Layout, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one aspect, pvbns are used as block pointers within buffer trees of files (such as file 400) stored in a flexible volume. This "hybrid" flexible volume example involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 5:
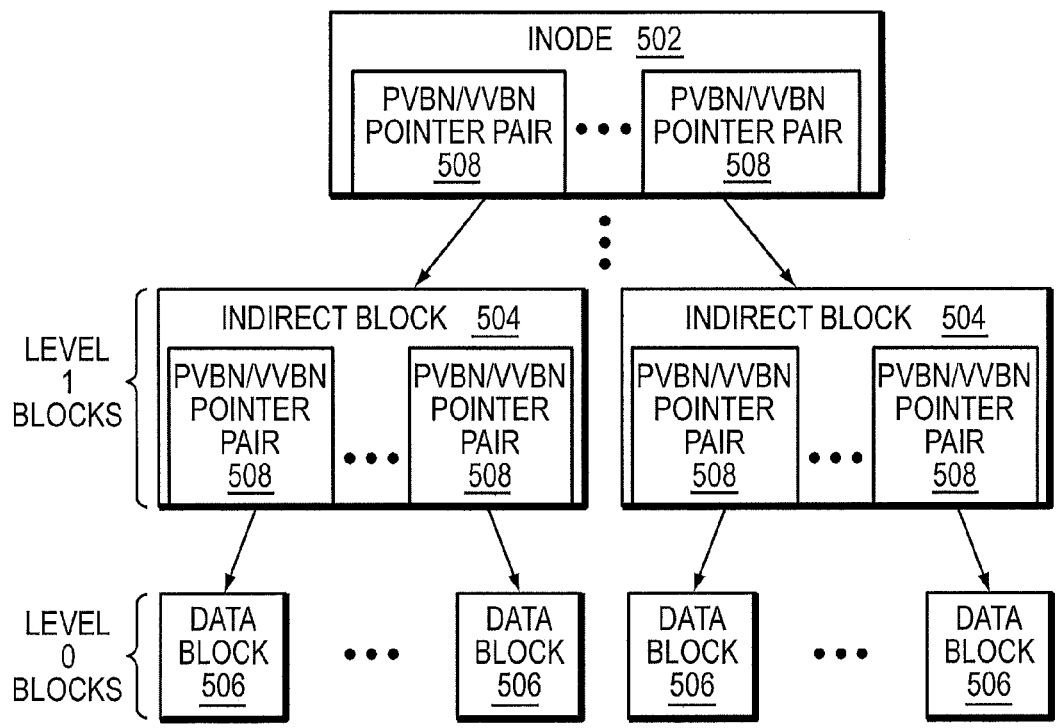
FIG. 5 is a schematic block diagram of an illustrative buffer tree of a file that may be advantageously used with the present invention.

In an illustrative dual vbn hybrid flexible volume, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the flexible volume. The use of pvbns as block pointers 508 in the indirect blocks 504 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
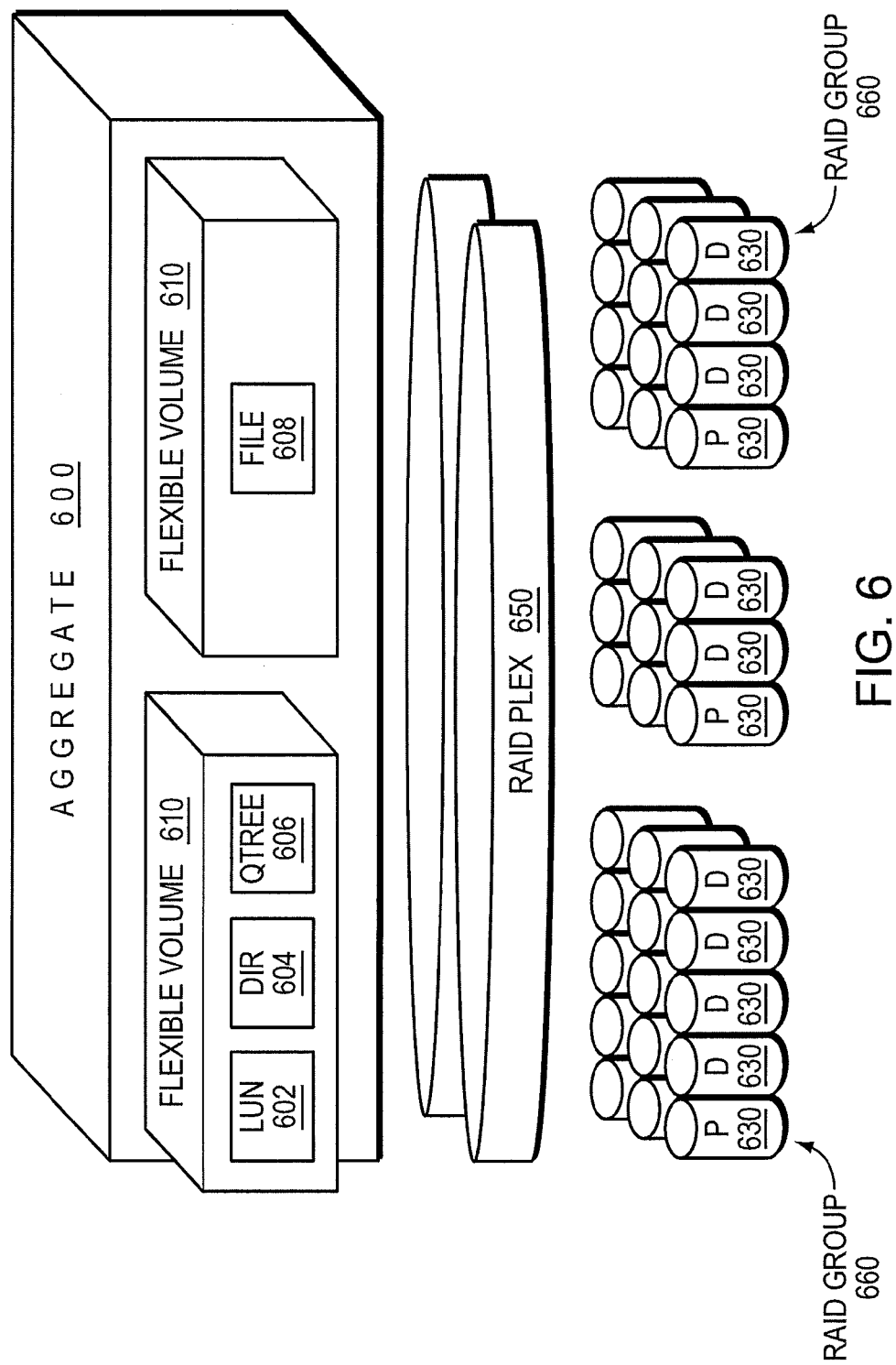
FIG. 6 is a schematic block diagram of an exemplary aggregate.

FIG. 6 is a schematic block diagram of an illustrative aggregate 600 that may be advantageously used with the present invention. Luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 610 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 7:
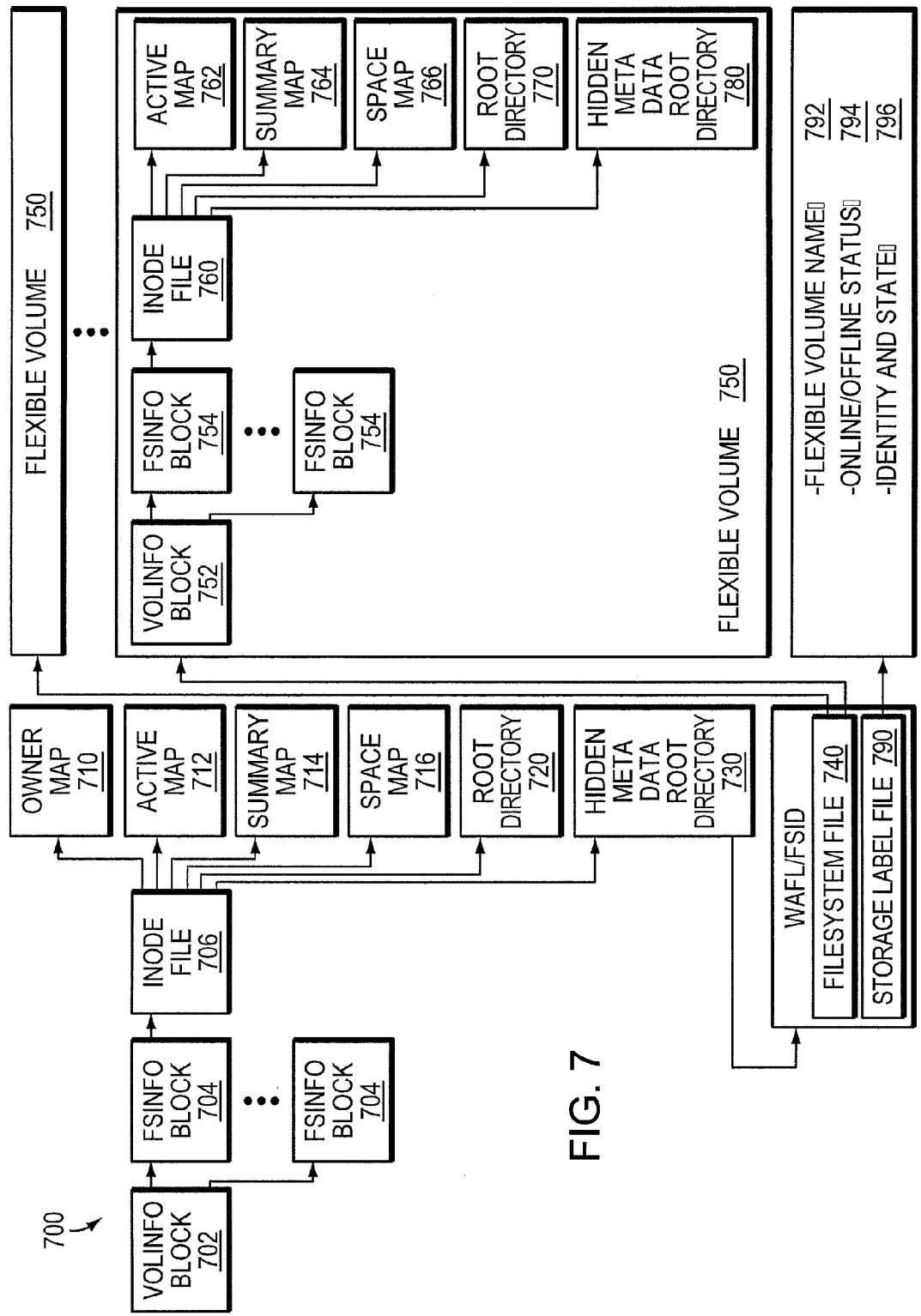
FIG. 7 is a schematic block diagram of an exemplary on-disk layout of the aggregate.

FIG. 7 is a schematic block diagram of an on-disk representation of an aggregate 700. The storage operating system 300, e.g., the RAID system 380, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special meta-data files. The inode file 706 further includes a root directory 720 and a "hidden" meta-data root directory 730, the latter of which includes a namespace having files related to a flexible volume in which users cannot "see" the files. The hidden meta-data root directory includes the WAFL/fsid/directory structure that contains filesystem file 740 and storage label file 790. Note that root directory 720 in the aggregate is empty; all files related to the aggregate are organized within the hidden meta-data root directory 730.

In addition to being embodied as a container file having level 1 blocks organized as a container map, the filesystem file 740 includes block pointers that reference various file systems embodied as flexible volumes 750. The aggregate 700 maintains these flexible volumes 750 at special reserved inode numbers. Each flexible volume 750 also has special reserved inode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

VLDB

Figure 8:
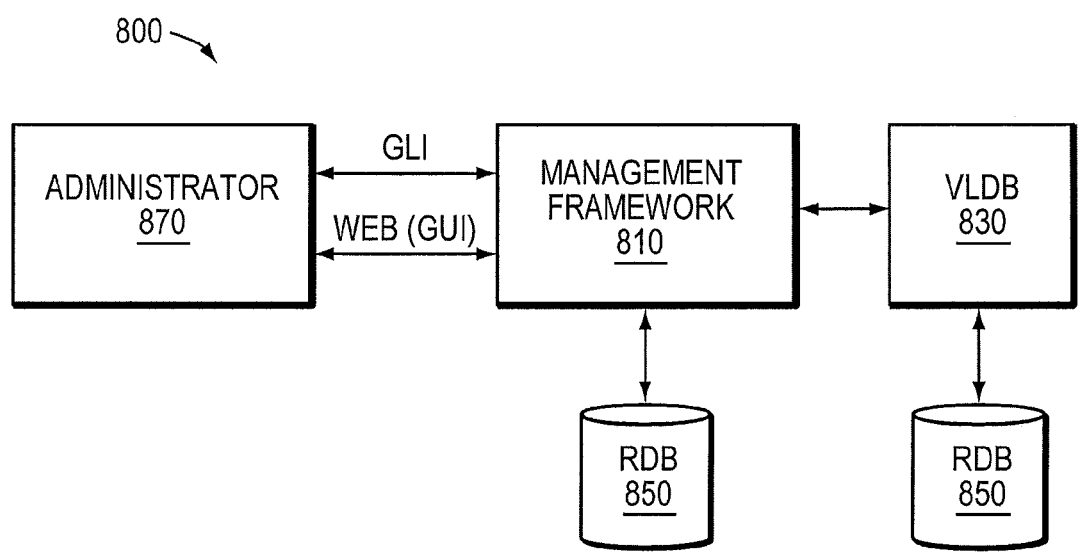
FIG. 8 is a schematic block diagram illustrating a collection of management processes.

FIG. 8 is a schematic block diagram illustrating a collection of management processes that execute as user mode applications 800 on the storage operating system 300 to provide management of configuration information (i.e. management data) for the nodes of the cluster. To that end, the management processes include a management framework process 810 and a volume location database (VLDB) process 830, each utilizing a data replication service (RDB 850) linked as a library. The management framework 810 provides an administrator 870 an interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 830 is a database process that tracks the locations of various storage components, including data containers such as flexible volumes, (hereafter "volumes") within the cluster 100 to thereby facilitate routing of requests throughout the cluster.

Multi-Node Failures

Figure 9:
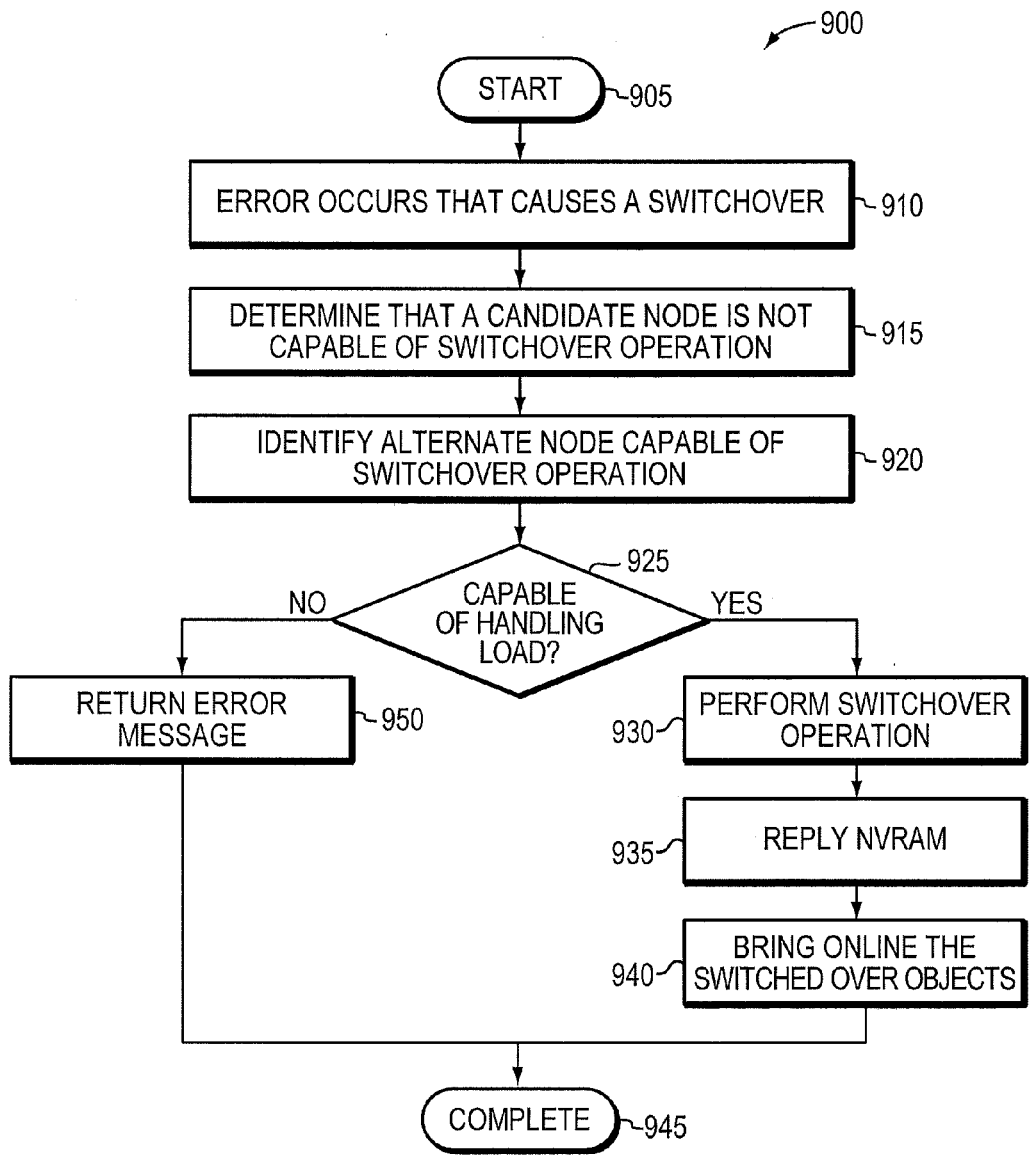
FIG. 9 is a flowchart detailing the steps of a procedure for performing a switchover operation.

FIG. 9 is a flowchart detailing the steps of a procedure 900 for performing a switchover operation when one node may need to handle multiple disaster recovery partners. The procedure 900 begins in step 905 and continues to step 910 where an error condition occurs that causes a switchover operation to be initiated. The error condition may be the result of natural disaster, power failure, software and/or hardware failure, etc. Illustratively, the switchover operation will be described in terms of site A of FIG. 1 failing with site B being the surviving site. However, it should be noted that this description is for exemplary purposes only and that the principles of the present disclosure may be utilized for bidirectional switchover, i.e., if site B suffers an error condition, site A may function as a surviving site. In response to the initiation of the switchover operation, the DRC determines that a candidate node is not capable of switch over operation in step 915. As will be appreciated by those skilled in the art, if all nodes are capable of switchover operation, a switchover operation proceeds normally. However should the DRC, working in conjunction with the DRSOMs executing on each node, determined that one of the candidate nodes is not capable of switchover operation, then it may be necessary to identify an alternative node. A node may not be capable of processing the switchover operation if, for example, its object limit option is disabled and the switchover operation would result in more than the maximum number of objects being serviced by the node. Alternatively, the candidate node may be suffering an error condition or otherwise be unavailable for processing operations during the switchover.

In response to determining that a candidate node is not capable, the procedure continues to step 920 to identify an alternate node capable of switchover operation. This alternate node may be a surviving node of a particular site or in an N-way configuration may be one of a plurality of nodes on a site that is not currently being utilized for switchover operations. A determination is then made in step 925 whether the alternate node is capable of handling the load. That is, a determination is made whether the alternate nodes servicing of switchover objects would cause the node to exceed its maximum number of objects being serviced. This may occur due to, for example, the object limit option being disabled on a particular node, thereby setting its maximum object limit at 2N. Should a double failure be occurring, the alternate node could potentially need to service up to 4N volumes. In such a case, the procedure branches to step 950 and returns an error message indicating that switchover operation is not possible. The procedure then completes in step 945. It should be noted by returning the error message 950 and not entering into a switchover mode, data connectivity may be lost. Client connectivity to data may return when the underlying error condition is corrected so that additional nodes are brought online to service the various volumes engaged in the switchover operation. Further, administrator may modify the object limit option to be activated, thereby causing a alternate node that was incapable of handling the load to become one capable of handling the load.

However, if in step 925 it is determined that the alternate node is capable of handling the load, the procedure branches to step 930 were the switchover operation is performed. This may occur by, for example, the selected node taking ownership of the disks, aggregates and volumes of the failed node using conventional operations. Once the switchover operation has been completed, the surviving node then replays the NVRAM in step 935. Illustratively, the NVRAM within the selected node has been receiving mirroring operations of the failed nodes as described above in relation to NVRAM mirroring. As such, the selected surviving node may replay the data contained within the NVRAM to bring the aggregates, volumes and disks to a fully consistent state. Once the disks are brought to a consistent state, the surviving node then brings the switchover objects online in step 940. At this point, the surviving node is capable of processing data access request directed to the objects, e.g., volumes, aggregates and/or disks. The procedure 900 then completes in step 945.

Figure 10:
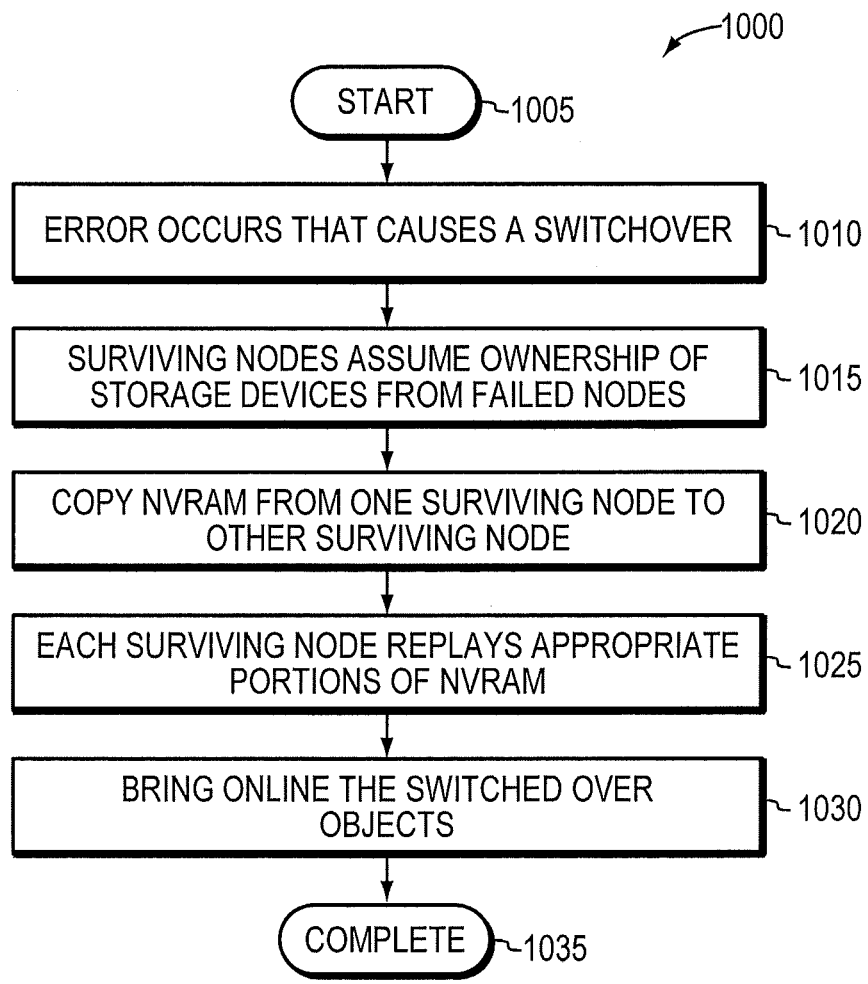
FIG. 10 is a flowchart detailing the steps of a procedure for performing a switchover operation in a rolling disaster.

FIG. 10 is a flowchart detailing the steps of a procedure 1000 for performing a switchover operation in a rolling disaster. Illustratively, a rolling disaster scenario is when nodes fail sequentially in the disaster site. A rolling disaster is illustratively deemed a single disaster, so that the switchover operation should succeed in the DR site even if the node object limi option is off as long as the DR site nodes are not in takeover mode. The procedure 1000 begins in step 1005 and continues to step 1010 where an error condition occurs that causes a switchover operation to occur. As noted above, the error condition may be the result of natural disaster, hardware and/or software failure, etc. For the purpose of the example described herein with relation to procedure 1000, assume that node 200A2 had previously failed and node 200A1 was servicing all aggregates, volumes and disks that were previously owned by node 200A2. The error condition then occurs that results in node 200A1 going offline. As a result of the error condition, nodes 200B1 and 200B2 (i.e., site B) perform a switchover operation to manage the data sets from site A The surviving nodes assume ownership of the storage devices from the failed nodes in step 1015. This may be accomplished using conventional disk ownership techniques as are well known in the art. Continuing the example described above, node 200B1 will assume ownership of disks (and associated aggregates/volumes) that were originally owned by node 200A1, while node 200B2 will assume ownership of disks that were originally owned by node 200A2. As node 200B2's partner (node 200A2) was not active, it may not have been receiving NVRAM mirroring operations, as described above. Thus, the NVRAM is then copied from one surviving node to the other surviving node in step 1020. Illustratively, the NVRAM from node 200B1 is copied to node 200B2 so that node 200B2 has the requisite data to render the data sets that were switched over to it into a fully consistent state.

Each surviving node then replays the appropriate portion of the NVRAM in step 1025. Again, using the above example, node 200B1 would replay the NVRAM portions directed to disks that were managed by node 200A1. Similarly, node 200B2 would replay those portions of NVRAM directed to the disks previously managed by node 200A2. Once the NVRAM has been replayed, the surviving nodes bring online the switched over objects (disks, aggregates, volumes, etc.) in step 1030. The procedure 1000 then completes in step 1035.

It should be noted that in an alternative aspect, node 200A2 may have rebooted and begun assuming ownership of aggregates from node 200A1 at the time when the switchover operation occurs. In such an example, the disks originally owned by node 200A1 would be transferred to node 200B1 and the disks originally owned by node 200A2 would be transferred to node 200B2, even they may currently be owned by node 200A1. In such a case, the copying of the NVRAM from node 200B1 to node 200B2 ensures that node 200B2 has the appropriate data to replay to the disks that it has taken over.

The foregoing description has been directed to specific aspects of the disclosure. It will be apparent, however, that other variations and modifications may be made to the described examples, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the aspects herein. Therefore, it is the object of the appended claims to cover all such variations and modifications as come within the true spirit and scope of the aspects of the disclosure herein.

What is claimed is:

1. A method comprising:
    determining that a candidate node is not available for a switchover operation to takeover for a failed node of a plurality of nodes;
    identifying an alternate node for the switchover operation based upon a determination that the alternate node has resources capable of handling a load of the failed node and that an object limit option for the alternate node is disabled;
    performing the switchover operation to directly transfer ownership of a storage object of the failed node to the alternate node without transferring ownership of the storage object to the candidate node;
    recovering data from a non-volatile memory to the storage object; and
    bringing the storage object online.

2. The method of claim 1, wherein the determining comprises:
    determining that the candidate node is not available based upon a determination that the candidate node would service a number of storage objects that exceeds an object limit if the candidate node was used for the switchover operation.

3. The method of claim 1, wherein the determining comprises:
    determining that the candidate node is not available based upon a determination that the candidate node is suffering an error condition.

4. The method of claim 1, wherein the plurality of nodes comprises a first node arranged in a high availability pairing with a second node.

5. The method of claim 4, comprising:
    detecting a failure on the first node; and
    performing a failover operation from the first node to the second node.

6. The method of claim 1, wherein the identifying comprises:

identifying the alternate node based upon a determination that the alternate node would not service a number of storage objects that exceeds an object limit if the alternate node was used for the switchover operation.

7. The method of claim 1, wherein recovering data from the non-volatile memory comprises:
replaying a portion of data stored in the non-volatile memory that was mirrored from the failed node.

8. The method of claim 1, wherein the identifying comprises:
determining that a potential alternate node is not available based upon a determination that the potential alternate node would service a number of storage objects that exceeds an object limit if the potential alternate node was used for the switchover operation.

9. The method of claim 8, comprising:
modifying the object limit to create an increased object limit for the potential alternate node; and
determining that the potential alternate node is available as the alternate node based upon a subsequent determination that the potential alternate node would not service a number of storage objects that exceeds the increased object limit if the potential alternate node was used for the switchover operation.

10. A computing device comprising:
a memory containing computer readable medium having stored thereon instructions for performing a method; and
a processor coupled with the memory, the processor configured to execute the instructions to cause the processor to:
determine that a candidate node is not available for a switchover operation to takeover for a failed node of a plurality of nodes;
identify an alternate node for the switchover operation based upon a determination that the alternate node has resources capable of handling a load of the failed node and that an object limit option for the alternate node is disabled;
perform the switchover operation to directly transfer ownership of a storage object of the failed node to the alternate node without transferring ownership of the storage object to the candidate node;
recover data from a non-volatile memory to the storage object; and
bring the storage object online.

11. The computing device of claim 10, wherein the instructions cause the processor to:
determine that the candidate node is not available based upon a determination that the candidate node would service a number of storage objects that exceeds an object limit if the candidate node was used for the switchover operation.

12. The computing device of claim 10, wherein the instructions cause the processor to:
determine that the candidate node is not available based upon a determination that the candidate node is suffering an error condition.

13. The computing device of claim 10, wherein the instructions cause the processor to:

identify the alternate node based upon a determination that the alternate node would not service a number of storage objects that exceeds an object limit if the alternate node was used for the switchover operation.

14. The computing device of claim 10, wherein the instructions cause the processor to:
replay a portion of data stored in the non-volatile memory that was mirrored from the failed node.

15. The computing device of claim 10, wherein the instructions cause the processor to:
determine that a potential alternate node is not available for the switchover operation based upon a determination that the potential alternate node would service a number of storage objects that exceeds an object limit if the potential alternate node was used for the switchover operation.

16. The computing device of claim 15, wherein the instructions cause the processor to:
modify the object limit to create an increased object limit for the potential alternate node.

17. The computing device of claim 16, wherein the instructions cause the processor to:
determine that the potential alternate node is available for the switchover operation based upon a subsequent determination that the potential alternate node would not service a number of storage objects that exceeds the increased object limit if the potential alternate node was used for the switchover operation.

18. The computing device of claim 10, wherein the storage object is stored within a storage device that is modified, based upon the switchover operation, to conform to the alternate node.

19. A computer readable medium comprising program instructions, that when executed by a processor, cause the processor to:
determine that a candidate node is not available for a switchover operation to takeover for a failed node of a plurality of nodes;
identify an alternate node for the switchover operation based upon a determination that the alternate node has resources capable of handling a load of the failed node and that an object limit option for the alternate node is disabled;
perform the switchover operation to directly transfer ownership of a storage object of the failed node to the alternate node without transferring ownership of the storage object to the candidate node;
recover data from a non-volatile memory to the storage object; and
bring the storage object online.

20. The computer readable medium of claim 19, wherein the program instructions cause the processor to:
replay a portion of data stored in the non-volatile memory that was mirrored from the failed node.

* * * * *